United States Patent
Bivens et al.

(10) Patent No.: US 7,817,578 B2
(45) Date of Patent: Oct. 19, 2010

(54) METHOD FOR INTEGRATING DOWNSTREAM PERFORMANCE AND RESOURCE USAGE STATISTICS INTO LOAD BALANCING WEIGHTS

(75) Inventors: John Alan Bivens, Ossining, NY (US); Yuksel Gunal, New York, NY (US); Peter Bergersen Yocom, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 12/115,591

(22) Filed: May 6, 2008

(65) Prior Publication Data

US 2008/0239983 A1   Oct. 2, 2008

Related U.S. Application Data

(63) Continuation of application No. 11/442,845, filed on May 30, 2006, now Pat. No. 7,532,583.

(51) Int. Cl.
*H04L 12/26* (2006.01)

(52) U.S. Cl. .................. 370/252; 370/217; 370/221; 370/235

(58) Field of Classification Search ......... 370/216–218, 370/221, 225, 228, 232–235, 252, 253; 709/212, 709/213, 217, 218, 219, 223–226, 238–244
See application file for complete search history.

(56) References Cited

U.S. PATENT DOCUMENTS

| | | | |
|---|---|---|---|
| 2003/0231588 A1* | 12/2003 | Roth et al. | 370/230 |
| 2005/0066052 A1* | 3/2005 | Gupta et al. | 709/238 |
| 2005/0120095 A1 | 6/2005 | Aman et al. | |
| 2005/0188073 A1* | 8/2005 | Nakamichi et al. | 709/223 |
| 2005/0243723 A1* | 11/2005 | Randriamasy | 370/235 |
| 2007/0147254 A1* | 6/2007 | Larsson et al. | 370/238 |

* cited by examiner

*Primary Examiner*—Ricky Ngo
*Assistant Examiner*—Wei-Po Kao
(74) *Attorney, Agent, or Firm*—Yee & Associates, P.C.; Derek S. Jennings

(57) ABSTRACT

In datacenter environments, many copies of servicing components (application servers, http servers, etc) are used to handle larger loads. In these cases, incoming service requests typically go to a load balancer to be directed to the appropriate servicing component. Modern advances in technology, like the Server/Application State Protocol, have allowed load balancers to receive recommendations in the form of numerical weights to describe the best distribution for the incoming requests. The present invention provides a method for computing path oriented statistics that enable load balancing algorithms to transparently integrate downstream performance and resource usage statistics into load balancing weights.

20 Claims, 3 Drawing Sheets

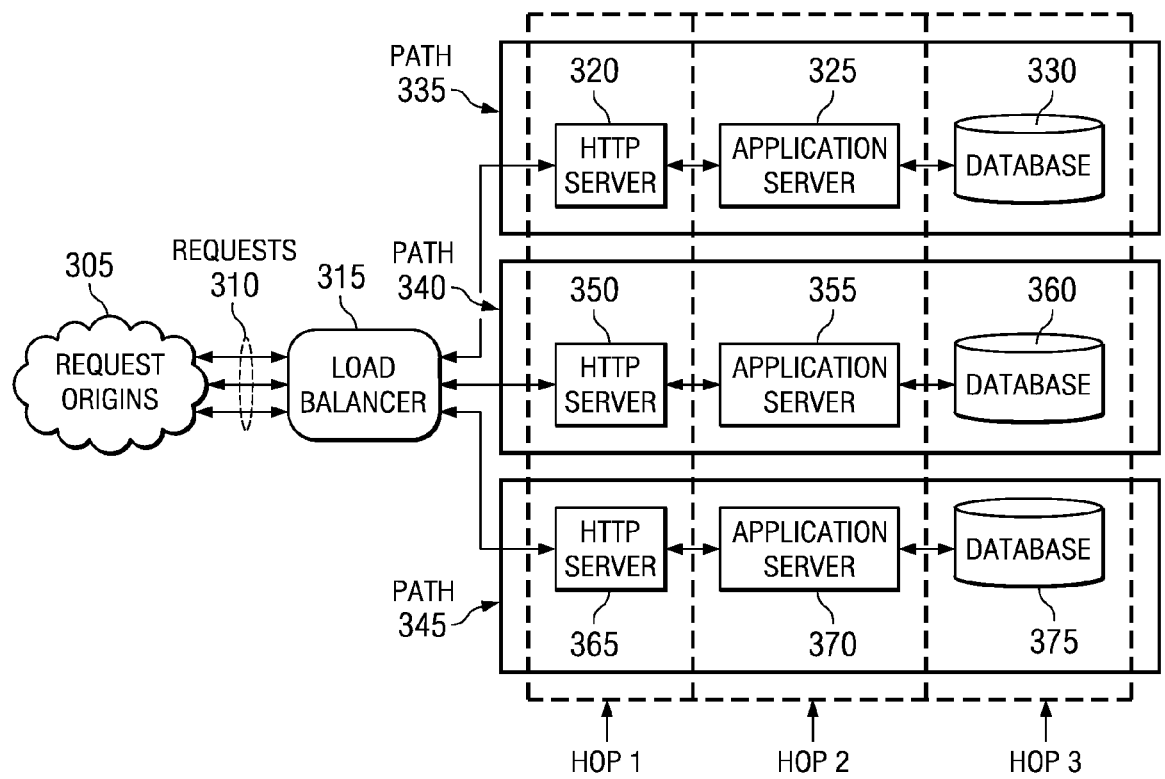
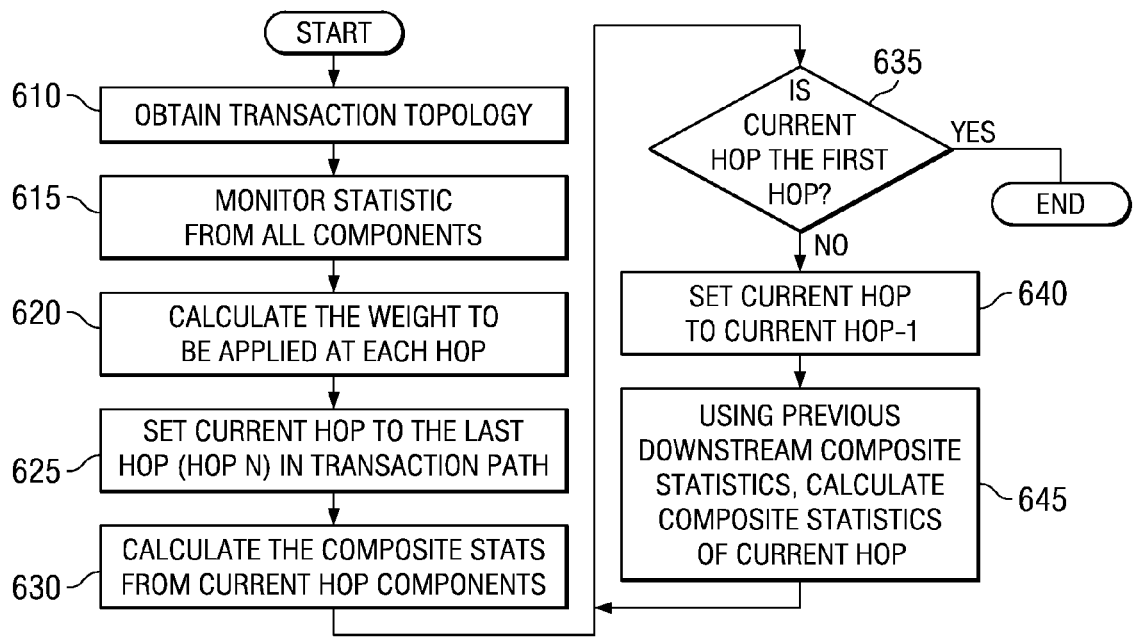

METHOD FOR INTEGRATING DOWNSTREAM PERFORMANCE AND RESOURCE USAGE STATISTICS INTO LOAD BALANCING WEIGHTS

This application is a continuation of application Ser. No. 11/442,845, filed May 30, 2006, now U.S. Pat. No. 7,532,583.

BACKGROUND OF THE INVENTION

1. Field of the Invention

The present invention relates generally to data processing systems. More specifically, the present invention relates to a computer implemented method, computer program product, and a system for computing path oriented statistics and integrating downstream performance and resource usage statistics into load balancing weights.

2. Description of the Related Art

In datacenter environments, many copies of servicing components, such as application servers, http servers, and so forth, are used to handle increasingly large loads. In these cases, incoming service requests typically go to a load balancer to be directed to the appropriate servicing component. Modern advances in technology, like the Server/Application State Protocol (SASP), have allowed load balancers to receive recommendations, in the form of numerical weights, as to the best distribution of the incoming requests. Previous techniques for dynamically calculating these weights involve using application performance and usage statistics from the set of components that are one hop away from the load balancer. Components that are one hop away are the components that the load balancer sends the incoming connections to directly.

Many of today's applications require transactions to go through several components before the transactions may be completed. If complications arise in any of the downstream components, the most important statistical information for the weight computation may be the information from the downstream components where the complication is arising. A downstream component is a component touched by a transaction after the transaction touches the first component. Therefore, it would be advantageous to provide a way of computing applications or system statistics for the entire transaction path. These path-oriented statistics can then be used in any load balancing algorithm that uses application or system statistics for computing load balancing weights.

Patent application number US 2005-0120095 A1 entitled, "Apparatus and Method for Determining Load Balancing Weights Using Application Instance Statistical Information," published Jun. 2, 2005 addresses a complimentary issue. The US 2005-0120095 A1 application describes a method for generating load balancing weights using application statistics. However, the method described in the US 2005-0120095 A1 application only computes the load balancing weight based on the statistics from a single application, regardless of the number of applications involved in a transaction or of the path the transaction follows. The US 2005-0120095 A1 application does not address the problem of calculating path-oriented statistics. However, path-oriented statistics may be used in a load balancing weight generation algorithm like that described in US 2005-0120095 A1 application.

SUMMARY OF THE INVENTION

Exemplary embodiments describe a computer implemented method, a computer program product and a data processing system for computing path oriented statistics. A transaction path is determined for each transaction in a plurality of transactions to be processed. The transaction paths that start at a same component are combined to form a combined transaction path. A statistic from all components in the combined transaction paths is monitored, wherein the statistic is a statistic that is to be transformed into a plurality of composite statistics. A composite statistic is calculated for each component at each hop. The composite statistics for each component of the combined transaction path is combined to form an overall composite statistic for the combined transaction path.

BRIEF DESCRIPTION OF THE DRAWINGS

The novel features believed characteristic of the invention are set forth in the appended claims. The invention itself, as well as a preferred mode of use, further objectives and advantages thereof, will best be understood by reference to the following detailed description of an illustrative embodiment when read in conjunction with the accompanying drawings, wherein:

FIG. 3 is an exemplary diagram of a non-branching distributed data processing environment in which exemplary aspects may be implemented;

FIG. 6 is a flowchart illustrating the operation of computing path oriented statistics in accordance with exemplary embodiments.

DETAILED DESCRIPTION OF THE PREFERRED EMBODIMENT

Figure 1:
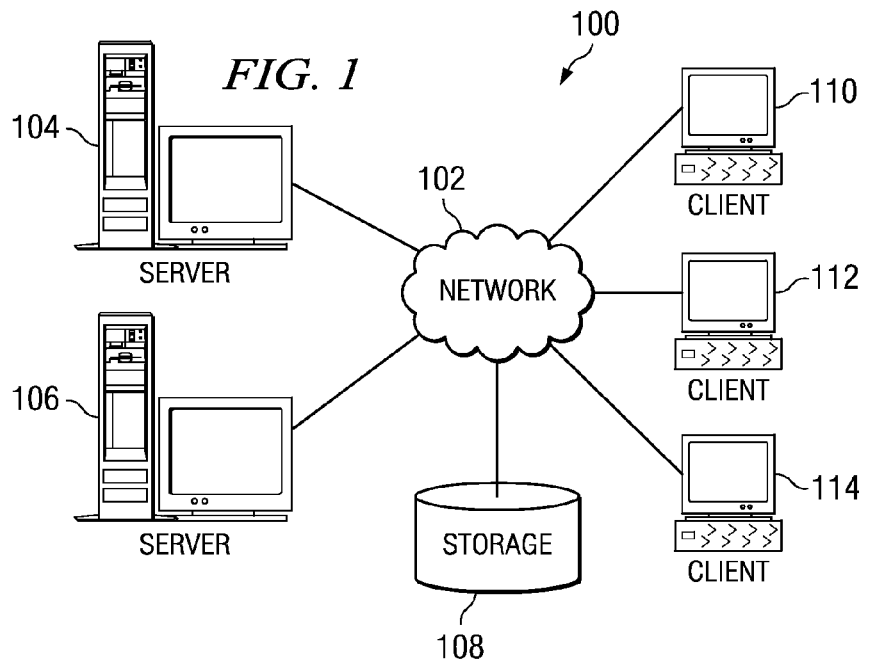
FIG. 1 is a pictorial representation of a network of data processing systems in which exemplary aspects may be implemented.
Figure 2:
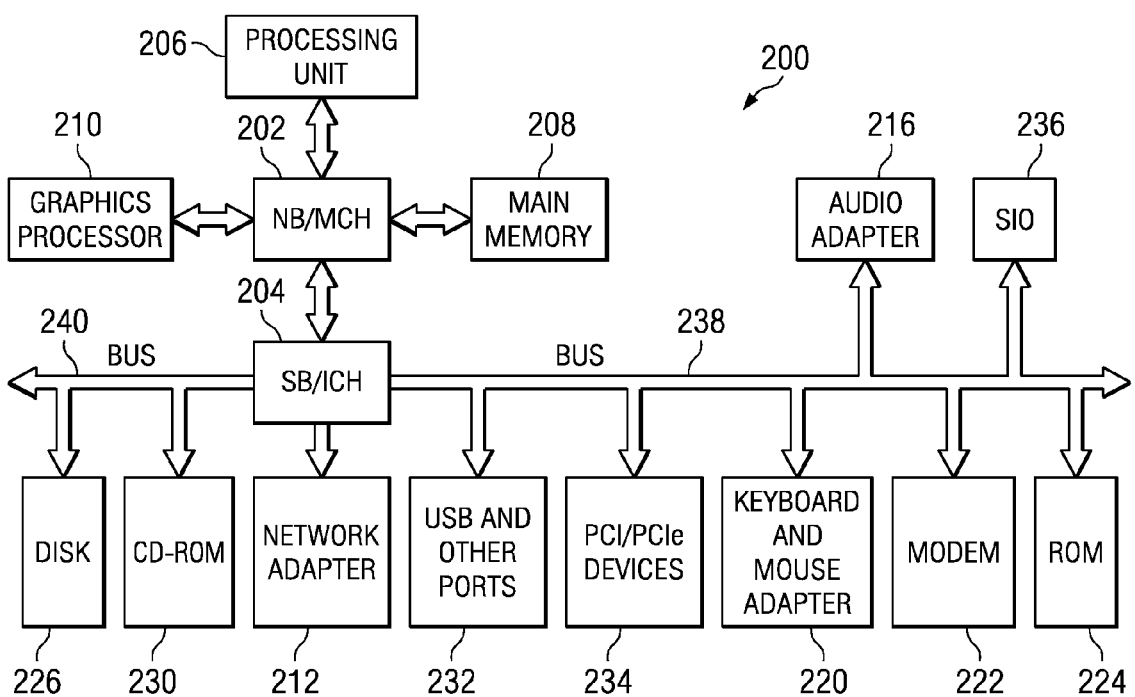
FIG. 2 is a block diagram of a data processing system in which exemplary aspects may be implemented.

FIGS. 1-2 are provided as exemplary diagrams of data processing environments in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope.

With reference now to the figures, FIG. 1 depicts a pictorial representation of a network of data processing systems in which aspects may be implemented. Network data processing system 100 is a network of computers in which exemplary embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Exemplary aspects provide a method for computing path oriented statistics that enable load balancing algorithms to transparently integrate downstream performance and resource usage statistics into load balancing weights.

In load balancing environments, the load balancer typically only knows about the set of components to which it directly sends the incoming connections. The connection may contain transactions that continue on to additional machines or components. For purposes of the present application, the different components through which transactions may travel before completion are referred to as "hops." A numerical designation describes how far hops are from the load balancer. For example, hop1 is the first hop from the load balancer, hop2 is the second hop from the load balancer, and so forth. In load balancing environments where dynamic load balancing weights are used, the weights are to provide the load balancer with an indication of how many or what fraction of the incoming connections should be sent to a particular first hop component. When incorporating downstream performance and resource usage statistics into metrics for use in load balancing algorithms, the path transactions take must be examined to make sure the right portion of downstream statistics are attributed to the correct hop1 component. The path the transaction takes is referred to as the "application topology." This type of path-oriented statistic is referred to as a "composite" statistic.

Application topologies can be provided statically by the administrator. Alternatively, the application topologies can be obtained dynamically using application instrumentation supported with a correlator, such as, for example, Application Response Measurement (ARM). The correlator is a set of bytes sent with the transaction to map the work done on one component to work for the same transaction done on another component. In a straight-forward single-path application topology, the correlation of downstream statistics is direct; all statistical effects seen in downstream components may be wholly attributed to their corresponding first component. For example, FIG. 3 illustrates three separate, isolated application transaction paths, paths 335, 340, and 345. A transaction path is the path of components that the transaction flows through. For the top transaction path, path 335, the downstream statistics from database 330 and application server 325 are combined with the statistics of the hop1 component, HTTP server 320, to form the new statistic for hop1.

FIG. 3 is an exemplary diagram of a non-branching distributed data processing environment in which exemplary aspects may be implemented. FIG. 3 may be implemented as a network data processing system, such as network data processing system 100 in FIG. 1. Incoming requests 310, which are transactions, originate from request origins 305 and are sent to load balancer 315. An example of a transaction could be a request for recent stock quotes, product prices, or news stories. Load balancer 315 then sends the requests to one of the transaction paths, path 335, 340, or 345. Path 335 is comprised of components HTTP server 320, Application server 325 and database 330. HTTP Server 320 is hop1 for path 335. Application server 325 is hop2 for path 335. Database 330 is hop3 for path 335. Path 340 is comprised of components HTTP server 350, Application server 355 and database 360. HTTP Server 350 is hop1 for path 340. Application server 355 is hop2 for path 340. Database 360 is hop3 for path 340. Path 345 is comprised of components HTTP server 365, Application server 370 and database 375. HTTP Server 365 is hop1 for path 345. Application server 370 is hop2 for path 345. Database 375 is hop3 for path 345.

If the load balancing environment has branching application topology paths, care must be taken to attribute the correct proportion of downstream statistics to the corresponding hop1 component. These composite statistics are best formed by combining portions of the composite statistics of downstream components that are proportional to the fraction of transactions sent to each of those components. When combining the data from the different hops, some hops may be treated differently to emphasize their importance. For this purpose, a hop weighting coefficient, $W_{hopX}$, is used. Methods for calculating a correct value for this coefficient is discussed later in the application. An example of the calculation of a general composite statistic A from component x at hop N can be expressed as the following equation:

$$CompositeStat_A(x) = W_{hopN} \times stat_A(x) + \sum_{y=firstHop(N+1)Node}^{lastHop(N+1)Node} \left[ \frac{TC_{x-y}}{TotalTransOut(x)} \times CompositeStat_A(y) \right]$$

where:
$W_{hopN}$=the weight given to hop N.
$stat_A(x)$=the non-composite value of statistic A at component x.
$\sum_{firstHop(N+1)Node}^{LastHop(N+1)Node}$=a summation over the entire set of hop (N+1) components.

$TC_{x-y}$=number of transactions flowing from component x to component y.
TotalTransOut(x)=total number of transactions flowing from component x.

From the above equation, it can be seen that one may start with the actual value of statistic A at component x, $stat_A(x)$, and add fractions of the composite statistic A of the directly connected downstream hops proportionate to the number of transactions component x sends to each particular component which may be expressed as:

$$\sum_{y=firstHop(N+1)Node}^{lastHop(N+1)Node} \left[ \frac{TC_{x-y}}{TotalTransOut(x)} \times CompositeStat_A(y) \right]$$

Figure 4:
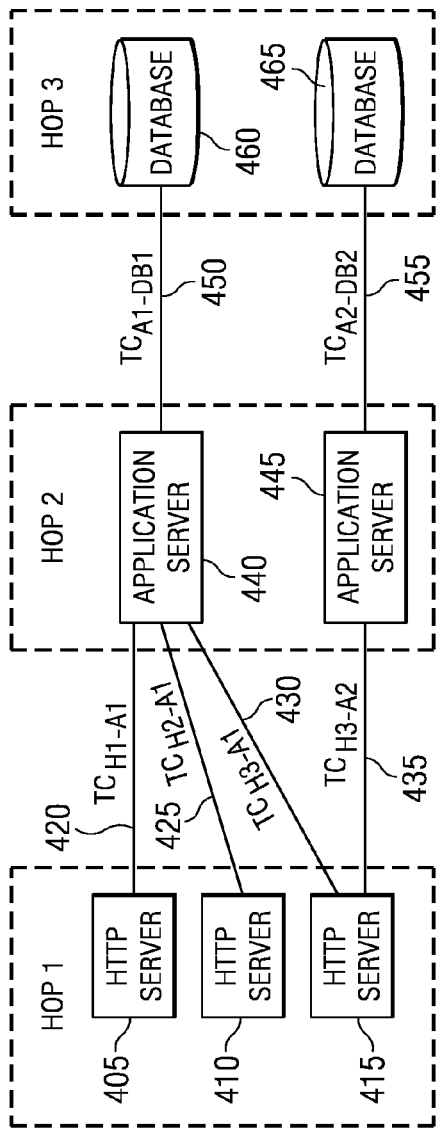
FIG. 4 is an exemplary diagram of a branching distributed data processing environment with statistical values in which exemplary aspects may be implemented.

An illustration of such a branching topology is provided in FIG. 4. A combined transaction path is a set of one or more transaction paths that start at the same hop 1 component. An "overall" composite statistic for a combined transaction path is the sum of the fractional downstream composite statistics of the combined transaction path and may be expressed as the $CompositeStat_A(x)$ equation shown above.

FIG. 4 is an exemplary diagram of a branching distributed data processing environment with statistical values in which exemplary aspects may be implemented. The branching distributed data processing environment comprises three hop1 components, HTTP server 405, HTTP server 410, and HTTP server 415; two hop2 components, application server 440 and application server 445; and two hop3 components, database 460 and database 465. Paths 420, 425, 430, and 435 represent the routes transactions take between specific hop1 and hop2 components. Path 420 represents the path between HTTP server 405 and Application server 440. Path 425 represents the path between HTTP server 410 and Application server 440. Both paths 430 and 435 originate from HTTP server 415, indicating a branching path. Path 430 represents the path between HTTP server 415 and Application server 440, while path 435 represents the path between HTTP server 415 and Application server 445. Paths 450 and 455 represent the routes transactions take between specific hop2 and hop3 components. Path 450 represents the path between application server 440 and database 460. Path 455 represents the path between application server 445 and database 465.

The calculation of a particular statistic, composite $stat_A$, for the paths starting with HTTP Servers 405, 410, and 415 of hop1 would begin with apportioning the composite $stat_A$ of hop3 and attributing the composite $stat_A$ to the appropriate components of hop2. The process would continue to apportion the resulting hop2 composite $stat_A$ calculations and attributing the resulting hop2 composite $stat_A$ to the appropriate components of hop1.

The composite statistics for the hop3 components may be calculated using the following equations:

$CompositeStat_A(DB1) = W_{hop3} \times stat_A(DB1)$ $CompositeStat_A(DB2) = W_{hop3} \times stat_A(DB2)$ The first equation represents the composite statistics for database 460, denoted in the equation as DB1. The second equation represents the composite statistics for database 465, denoted in the equation as DB2. Notice that the downstream component part of these two equations is evaluated as zero and not shown in the equation. This is because the components database 460 and database 465 are the last in the application path and have no downstream components.

After calculating the composite statistics for databases 460 and 465 the composite $stat_A$ for application server 440 and application server 445 is calculated. Application server 440 is denoted in the following equations as AppServer1. Application server 445 is denoted in the following equations as AppServer2. Database 460 is denoted in the following equations as DB1. Database 465 is denoted in the following equations as DB2. $TC_{A1-DB1}$, denoted by reference number 450, represents the number of transactions sent from AppServer1 to DB1. $TC_{A2-DB2}$, denoted by reference number 455, represents the number of transactions sent from AppServer2 to DB2. The composite statistics for application servers 440 and 445 may be calculated using the following equations:

$$CompositeStat_A(AppServer1) =$$
$$W_{hop2} \times stat_A(AppServer1) + \left(\frac{TC_{A1-DB1}}{TC_{A1-DB1}} \times CompositeStat_A(DB1)\right)$$

$$CompositeStat_A(AppServer2) =$$
$$W_{hop2} \times stat_A(AppServer2) + \left(\frac{TC_{A2-DB2}}{TC_{A2-DB2}} \times CompositeStat_A(DB2)\right)$$

The composite statistics for the hop3 components do not need to be apportioned because each of the hop2 components are connected to only one downstream component, application server 440 is connected only to database 460 and application server 445 is connected only to database 465. After obtaining composite statistics for each of the hop2 components, the composite statistics for the hop1 components can be computed using the following equations:

$$CompositeStatA(HTTP1) =$$
$$W_{hop1} \times stat_A(HTTP1) + \left(\frac{TC_{H1-A1}}{TC_{H1-A1}} \times CompositeStat_A(AppServer1)\right)$$

$$CompositeStatA(HTTP2) =$$
$$W_{hop1} \times stat_A(HTTP2) + \left(\frac{TC_{H2-A1}}{TC_{H2-A1}} \times CompositeStat_A(AppServer1)\right)$$

$$CompositeStat_A(HTTP3) = W_{hop1} \times stat_A(HTTP3) +$$
$$\left(\frac{TC_{H3-A1}}{TC_{H3-A1} + TC_{H3-A2}} \times CompositeStat_A(AppServer1)\right) +$$
$$\left(\frac{TC_{H3-A2}}{TC_{H3-A1} + TC_{H3-A2}} \times CompositeStat_A(AppServer2)\right)$$

Application server 440 is denoted in the equations as AppServer1. Application server 445 is denoted in the equations as AppServer2. HTTP server 405 is denoted in the equations as HTTP1. HTTP server 410 is denoted in the equations as HTTP2. HTTP server 415 is denoted in the equations as HTTP3. $TC_{H1-A1}$, denoted by reference number 420, represents the number of transactions sent from HTTP1 to AppServer1. $TC_{H2-A1}$, denoted by reference number 425, represents the number of transactions sent from HTTP2 to AppServer1. $TC_{H3-A1}$, denoted by reference number 430, represents the number of transactions sent from HTTP3 to AppServer1. $TC_{H3-A2}$, denoted by reference number 435, represents the number of transactions sent from HTTP2 to AppServer2. The composite statistics for HTTP1 and HTTP2 contain non-branching paths so their downstream component contributions do not need to be apportioned. HTTP3 does contain a branching path, so the composite statistics for AppServer1 and AppServer2 are apportioned to the proportion of transactions that went to each component. This approach is general and can be applied to all application topologies. Path-oriented composite statistics will transparently add depth and focus to applications and algorithms that use them. Path-oriented composite statistics will be particularly useful for resource usage and application result statistics which affect overall performance, such as CPU utilization, memory usage, application failures, and so forth. Statistics that have little meaning in downstream components do not benefit from such an extension. An example of a statistic that has little meaning in downstream components is the overall response time, which only exists in hop1 components.

The previous equations illustrate a way of attributing the data from downstream hops to the appropriate component of the first hop, but did not answer the question of how to weight statistics from each hop. That is, the calculation of appropriate values for $W_{hop1}$, $W_{hop2}$, and $W_{hop3}$ was not explained. In order to preserve the meaning of the path oriented statistic, the hop weights, $W_{hop1}$, $W_{hop2}$, and $W_{hop3}$, should be fractional values that add up to one. If this principle is not followed, path oriented statistical calculations could create values that make no sense. For example, consider a path oriented calculation for CPU utilization, a statistic that should range from zero to one. If hop weights that do not add up to one are used when computing this statistic, the resulting path oriented statistic may be out of range.

Consider the following scenario where a path oriented CPU utilization is computed with hop weights $W_{hop1}=2$, $W_{hop2}=4$, $W_{hop3}=3$, $stat_{CPU}(hop1component)=0.5$, $stat_{CPU}(hop2component)=0.5$, and $stat_{CPU}(hop3component)=0.5$: $CompositeStat_{CPU}(hop1component)=(2*0.5)+(4*0.5)+(3*0.5)=4.5$ As can be seen, the path oriented statistic computation yielded an out of range value of 4.5 for the CPU utilization.

In an exemplary embodiment, each hop is treated equally by making the weight of each hop the same fractional value that must add up to one:

$$W_{hop(i)} = \frac{1}{N}$$

for every i, where N is the total number of hops.

In another exemplary embodiment, the most important hop is determined and the weight of that hop is adjusted accordingly. For the purpose of computing load balancing weights, the most important hop is the hop where the transactions are spending the most amount of time. This hop is likely to be the hop where the usage and performance related statistics may make the biggest difference. Therefore, hops are weighted according to the average time spent at the hop. This length of time may be provided by the application through instrumentation or calculated using the difference between component based response times and times in which the component remains blocked while waiting on downstream components. The component time values may be aggregated accordingly to form the weight of the hop.

Current load balancers cannot distinguish between transactions that start at the same hop1 component and then have different transaction paths from hop2 onwards. However, were a load balancer able to distinguish between transactions that start at the same hop1 component but have different paths from hop2 onwards, exemplary embodiments are able to distinguish between these transaction paths and to calculate the downstream statistics for the load balancer. Rather than calculating an overall statistic for each transaction path that starts at the same hop1 component, an overall statistic could be calculated for each set of transaction paths that share the same complete transaction path.

Figure 5:
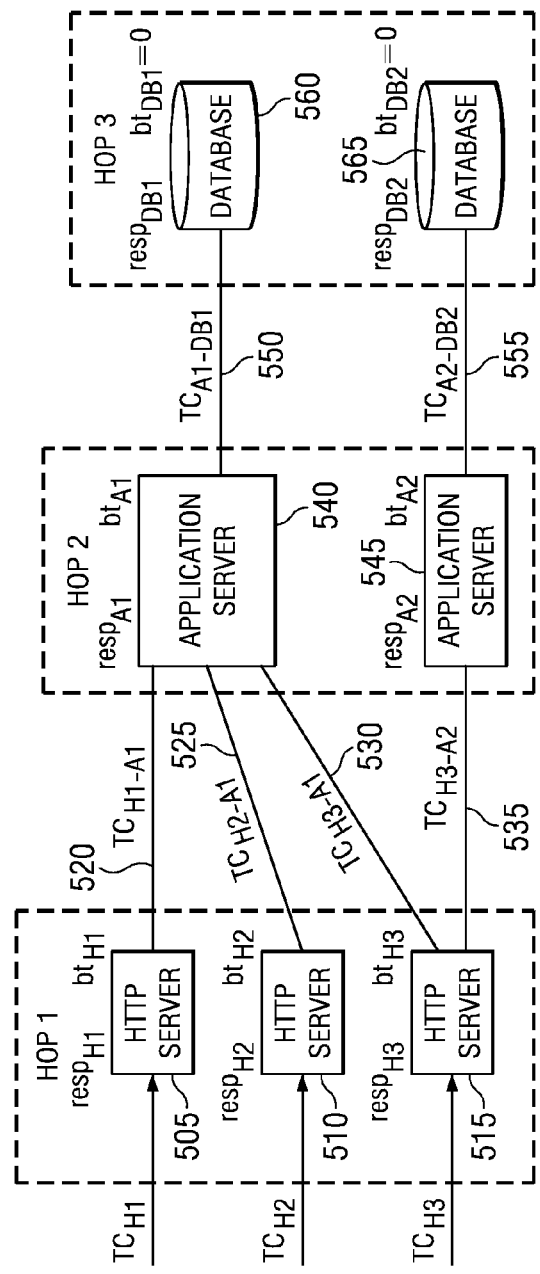
FIG. 5 is an exemplary diagram of a branching distributed data processing environment with statistical values and timings in which exemplary aspects may be implemented.

FIG. 5 is an exemplary diagram of a branching distributed data processing environment with statistical values and timings in which exemplary aspects may be implemented. FIG. 5 shows the branching distributed data processing environment of FIG. 4, but includes time notations for calculating hop weights. In FIG. 5 $resp_x$ equals the response time of transactions starting at component x, $bt_x$ equals the blocked time at component x, $TC_x$ equals the number of transactions processed at component x, and $TC_{x-y}$ equals the number of transactions sent from component x to component y. Blocked time refers to the amount of time component x is waiting for downstream components to process a request.

The branching distributed data processing environment comprises three hop1 components, HTTP server 505, HTTP server 510, and HTTP server 515; two hop2 components, application server 540 and application server 545; and two hop3 components, database 560 and database 565. Paths 520, 525, 530, and 535 represent the routes transaction take between specific hop1 and hop2 components. Path 520 represents the path between HTTP server 505 and Application server 540. Path 525 represents the path between HTTP server 510 and Application server 540. Both paths 530 and 535 originate from HTTP server 515, indicating a branching path. Path 530 represents the path between HTTP server 515 and Application server 540, while path 535 represents the path between HTTP server 515 and Application server 545. Paths 550 and 555 represent the routes transaction take between specific hop2 and hop3 components. Path 550 represents the path between application server 540 and database 560. Path 555 represents the path between application server 545 and database 565.

Computing the hop weight of hop1 will begin with determining time spent with each component of hop1. Application server 540 is denoted in the following equations as AppServer1. Application server 545 is denoted in the following equations as AppServer2. HTTP server 505 is denoted in the following equations as HTTP1. HTTP server 510 is denoted in the following equations as HTTP2. HTTP server 515 is denoted in the following equations as HTTP3. Database 560 is denoted in the following equations as DE1. Database 565 is denoted in the following equations as DE2. The equation for determining the time spent at a component of hop1 may be expressed as:

$HTTP1_{time} = resp_{H1} - bt_{H1}$ $HTTP2_{time} = resp_{H2} - bt_{H2}$ $HTTP3_{time} = resp_{H3} - bt_{H3}$ The times for these components are summed together to form the total time spent at hop1.

To accurately reflect the amount of time the transactions spend in the hop, one should take into account the number of transactions processed at each component when computing this aggregation. The following equation expresses this consideration:

$$HOP1_{time} = \frac{(HTTP1_{time}) * TC_{H1} + (HTTP2_{time}) * TC_{H2} + (HTTP3_{time}) * TC_{H3}}{TC_{H1} + TC_{H2} + TC_{H3}}$$

The weight of the second hop begins by first calculating the time spent at each of the components.

$APP1_{time} = resp_{A1} - bt_{A1}$ $APP2_{time} = resp_{A2} - bt_{A2}$

Next, the total time spent at the hop can be computed.

$$HOP2_{time} = \frac{(APP1_{time}) * (TC_{A1}) + (APP2_{time}) * (TC_{A2})}{TC_{A1} + TC_{A2}}$$

The same process is used for the calculating the time spent at hop3:

$DB1_{time} = resp_{DB1} - bt_{DB1}$ $DB2_{time} = resp_{DB2} - bt_{DB2}$ $$HOP3_{time} = \frac{(DB1_{time}) * TC_{DB1} + (DB1_{time}) * TC_{DB2}}{TC_{DB1} + TC_{DB2}}$$

Given the time spent in each hop, the weights for each hop may be computed in the following manner:

$$W_{hop1} = \frac{HOP1_{time}}{HOP1_{time} + HOP2_{time} + HOP3_{time}}$$

$$W_{hop2} = \frac{HOP2_{time}}{HOP1_{time} + HOP2_{time} + HOP3_{time}}$$

$$W_{hop3} = \frac{HOP3_{time}}{HOP1_{time} + HOP2_{time} + HOP3_{time}}$$

Incorporating these hop weights into the equations provided in the earlier composite statistic equations will help focus the resulting load balancing weight computation on the components in the topology that are most important.

FIG. 6 is a flowchart illustrating the operation of computing path oriented statistics in accordance with exemplary embodiments. The operation, which may be implemented by a load balancer, such as load balancer 315 in FIG. 3, begins by determining the, application topology, or transaction path, of a particular transaction, for each transaction being processed (step 610). The statistic to be transformed into composite statistics from each hop is monitored (step 615). The weight of each hop is also calculated (step 620) and will be used when computing the composite statistics. The hop1 composite calculation can be computed in a recursive manner by first calculating downstream composite statistics. This process begins at the very last hop. The operation sets the current hop to be the last hop, hop N (step 625). At each hop, the composite statistic should be calculated taking into account composite statistics previously computed at downstream hops, as shown by steps 630 and 645. The operation calculates the composite statistic for all the components of the current hop (step 630). The operation determines if the current hop is the first hop (step 635). If the current hop is not the first hop (a "no" output to step 635), the operation sets the current hop, hop N, equal to the current hop minus one, hop N=hop N−1 (step 640). The operation uses previous downstream composite statistics to calculate composite statistics of the current hop (step 645). The operation then repeats step 635. If the current hop is the first hop (a "yes" output to step 635), the overall composite statistic is complete and the operation ends.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for computing path oriented statistics, the computer implemented method comprising:
    determining a transaction path for each transaction in a plurality of transactions to be processed by a processor unit in a network data processing system;
    determining a combined transaction path, wherein the combined transaction path is a set of one or more transaction paths starting at a same hop;
    monitoring a statistic from all components in the combined transaction path, wherein the statistic is a statistic that is to be transformed into a plurality of composite statistics;
    calculating a hop weight for each hop using the statistic to form a calculated hop weight, wherein the statistic includes an average time spent at a hop and the hop weight is a fractional unit;
    determining a most important hop;
    adjusting the calculated hop weight using the statistic;
    calculating a composite statistic for each component at each hop using an adjusted hop weight, wherein the composite statistic includes composite statistics for downstream hops; and
    combining the composite statistic for each component of the combined transaction path to form an overall composite statistic for the combined transaction path.

2. The computer implemented method of claim 1, wherein the combined transaction path is a branching combined transaction path.

3. The computer implemented method of claim 2, wherein the composite statistics for each component of the combined transaction path are combined proportionally to a fraction of the plurality of transactions sent to each component.

4. The computer implemented method of claim 2, further comprising:
    calculating a weight for each hop, wherein the weight is used in calculating a composite statistic for each component at each hop.

5. The computer implemented method of claim 4, wherein the weight for each hop is the same fractional value that must add up to a total of one for all the hops.

6. The computer implemented method of claim 4, wherein the weight for each hop is based upon an average time transactions spend at each hop.

7. The computer implemented method of claim 1, wherein calculating a hop weight further comprises:
    determining time spent at each component of each hop, wherein time spent includes block time; and
    calculating a weight for each hop using the time spent, wherein the weight is used in calculating a composite statistic for each component at each hop.

8. The computer implemented method of claim 7, wherein the weight for each hop is the same fractional value that must add up to a total of one for all the hops.

9. The computer implemented method of claim 7, wherein the weight for each hop is based upon an average time a transaction spends at each hop.

10. The computer implemented method of claim 1, wherein the statistic that is to be transformed into a plurality of composite statistics is a resource usage statistic.

11. The computer implemented method of claim 1, wherein the combined transaction path comprise all the transaction paths that start at a same component and share a same complete transaction path.

12. The computer implemented method of claim 1, wherein the combined transaction path comprise all the transaction paths that have the same application topology.

13. A computer program product for computing path oriented statistics, the computer program product comprising:
    a memory element having computer usable program code stored thereon, the computer usable program code comprising:
    computer usable program code for determining a transaction path for each transaction in a plurality of transactions to be processed;
    computer usable program code for determining a combined transaction path, wherein the combined transaction path is a set of one or more transaction paths starting at a same hop;

computer usable program code for monitoring a statistic from all components in the combined transaction path, wherein the statistic is a statistic that is to be transformed into a plurality of composite statistics;

computer usable program code for calculating a hop weight for each hop using the statistic to form a calculated hop weight, wherein the statistic includes an average time spent at a hop and the hop weight is a fractional unit;

computer usable program code for determining a most important hop;

computer usable program code for adjusting the calculated hop weight using the statistic;

computer usable program code for calculating a composite statistic for each component at each hop using an adjusted hop weight, wherein the composite statistic includes composite statistics for downstream hops; and computer usable program code for combining the composite statistics statistic for each component of the combined transaction path to form an overall composite statistic for the combined transaction path.

14. The computer program product of claim 13, wherein the combined transaction path is a branching combined transaction path.

15. The computer program product of claim 14, wherein the composite statistics for each component of the combined transaction path are combined proportionally to a fraction of the plurality of transactions sent to each component.

16. The computer program product of claim 14, wherein computer usable program code for adjusting the calculated hop further comprises:

computer usable program code for determining time spent at each component of each hop, wherein time spent includes block time; and computer usable program code for calculating a weight for each hop using the time spent, wherein the weight is used in calculating a composite statistic for each component at each hop.

17. The computer program product of claim 16, wherein the weight for each hop is the same fractional value that must add up to a total of one for all the hops.

18. The computer program product of claim 16, wherein the weight for each hop is based upon an average time transactions spend at each hop.

19. The computer program product of claim 13, wherein the combined transaction path comprise all the transaction paths that start at a same component and share a same complete transaction path.

20. A data processing system for computing path oriented statistics, the data processing system comprising:

a storage device, wherein the storage device stores computer usable program code; and a processor, wherein the processor executes the computer usable program code to determine a transaction path for each transaction in a plurality of transactions to be processed;

determine a combined transaction path, wherein the combined transaction path is a set of one or more transaction paths starting at a same hop; monitor a statistic from all components in the combined transaction path, wherein the statistic is a statistic that is to be transformed into a plurality of composite statistics; calculate a hop weight for each hop using the statistic to form a calculated hop weight, wherein the statistic includes an average time spent at a hop and the hop weight is a fractional unit; determine a most important hop; adjust the calculated hop weight using the statistic; calculate a composite statistic for each component at each hop using an adjusted hop weight, wherein the composite statistic includes composite statistics for downstream hops; and combine the composite statistic for each component of the combined transaction path to form an overall composite statistic for the combined transaction path.

\* \* \* \* \*